United States Patent
Dahlquist et al.

(10) Patent No.: US 6,217,777 B1
(45) Date of Patent: Apr. 17, 2001

(54) FLOTATION APPARATUS AND PROCESS

(75) Inventors: Jan Dahlquist, Lund; Torsten Hedberg, Landvetter, both of (SE)

(73) Assignee: AW Creative Technologies Limited, Cambridgeshire (GB)

(*) Notice: Subject to any disclaimer, the term of this patent is extended or adjusted under 35 U.S.C. 154(b) by 0 days.

(21) Appl. No.: 09/077,686

(22) PCT Filed: Dec. 6, 1996

(86) PCT No.: PCT/SE96/01607

§ 371 Date: Jun. 19, 1998

§ 102(e) Date: Jun. 19, 1998

(87) PCT Pub. No.: WO97/20775

PCT Pub. Date: Jun. 12, 1997

(30) Foreign Application Priority Data

Dec. 7, 1995 (SE) .................................................. 9504386-5

(51) Int. Cl.[7] .................................. C02F 1/24; B01D 21/00
(52) U.S. Cl. .......................... 210/703; 210/802; 210/804; 210/294; 210/320; 210/221.2; 210/522
(58) Field of Search ............................... 210/221.2, 221.1, 210/521, 522, 294, 320, 804, 802, 703

(56) References Cited

U.S. PATENT DOCUMENTS

| | | |
|---|---|---|
| 3,613,889 | 10/1971 | Reed . |
| 3,706,384 | 12/1972 | Weijman-Hane . |
| 4,160,737 | 7/1979 | Plekerwood . |
| 4,231,867 | * 11/1980 | Sutphin . |
| 4,277,347 | * 7/1981 | Pielkenrood . |
| 4,344,845 | * 8/1982 | Pielkenrood . |
| 4,957,633 | * 9/1990 | Suutarinen . |
| 5,268,099 | 12/1993 | Krofta et al. . |
| 5,296,149 | 3/1994 | Krofta et al. . |

FOREIGN PATENT DOCUMENTS

| | | |
|---|---|---|
| 2039422 | 2/1971 | (DE) . |
| 2093443 | * 9/1982 | (GB) . |
| 2-222770 | * 9/1990 | (JP) . |
| 919999 | * 4/1982 | (SU) . |
| 1710514 | * 2/1992 | (SU) . |
| WO/23334 | 11/1993 | (WO) . |

* cited by examiner

Primary Examiner—Thomas M. Lithgow
(74) Attorney, Agent, or Firm—Burns, Doane, Swecker & Mathis LLP

(57) ABSTRACT

Flotation apparatus (1) for the purification of polluted water, comprising a flotation vessel (3) having an inlet means (23) for supplying polluted water to said vessel, an assembly (41) of spaced elements (43, 65) defining passages for the flow of water through said elements, and outlet means for surface sludge (15, 17) and outlet means (39, 45; 57, 61) for treated water, further comprising flow directing means for forcing the incoming polluted water to reach a level above said assembly (41) and to flow downwardly through said assembly and towards said treated water outlet means (39, 45; 57, 61); and a process for the purification of polluted water by flotation performed in such apparatus.

29 Claims, 2 Drawing Sheets

FLOTATION APPARATUS AND PROCESS

The present invention relates to the purification of polluted water, such as surface water, ground water as well as sewage water, and relates more specifically to an apparatus for such purification and to a process that can be performed in such apparatus.

In all purification of polluted water, such as surface water, ground water as well as sewage water, the separation processes are of utmost importance. For the manufacture of drinking water or for other purification of sewage water contaminants are removed in the form of particles. Said particles may occur naturally in the water entering the purification plant or they are formed in the biological or chemical processing. Normally, particles descend to the bottom of a vessel where they are separated as a bottom sludge. During history this has been the traditional manner of purifying water.

Another method for the purification of water is flotation which has been developed and refined since the 1950:ies. In flotation the particles are separated from the water by transportation up to the surface by means of very small air bubbles. These attach to the particles and form so called aggregates, the ascending rate of which is five to ten times that of the descending rate of corresponding particles.

In a traditional flotation plant for the treatment of water the water to be treated moves downward and leaves the tank from exit means near the bottom. A normal surface load for example in a process for potable water is 7–10 m/h. When this load is exceeded the downward velocity of the water increases to such an extent that air bubbles from the dispersion which normally rise to the surface leave the tank together with the outlet water. These air bubbles enter the subsequent filtration step where they behave like particles. The head loss of the filter increases dramatically and causes a more frequent backwash. The operational cost of the filtration process is thereby subject to increase. It seems as though the entrained air bubbles are not carrying any particles or very few particles since the turbidity on water samples containing air bubbles after the air bubbles have been removed increases only slightly.

The air bubble carry-over in the effluent is thus a limiting factor for the surface load of the process based on dissolved air flotation.

The main object of the present invention is to provide a flotation apparatus for the purification of polluted water, said apparatus enabling a significant increase of the surface load without significant entrainment of air bubbles in the discharged water.

Another object of the present invention is to provide a process for the purification of polluted water by flotation, in which the disadvantages associated with the prior art techniques will be substantially eliminated or at least significantly reduced.

Other objects and advantages of the present invention will be made clear in the following disclosure of specific embodiments.

The present invention is based on a new concept where the lamellae clarification technique is applied to flotation techniques in using an assembly of spaced elements defining passages for the flow of water through said elements where, instead of leaving the process from the top as in normal lamellae clarification the treated water is imparted a downward flow through the spaced elements to be discharged at the bottom. Air bubbles and particles attached thereto have a rising tendency but are forced by the flow of water at a high velocity downwards. During their downward transportation they will adhere to the back side of the spaced elements where they coalesce to form larger aggregates with other air bubbles until they have a rising force strong enough for leaving the spaced elements and rise to the top. Under this new concept all water to be purified has to pass from the top and down through the spaced elements to leave at the bottom.

Accordingly, the present invention provides for a lamellaeflotation apparatus for the purification of polluted water, comprising a flotation vessel having an inlet means for supplying polluted water to said vessel, an assembly of spaced elements defining passages for the flow of water through said elements, and outlet means for surface sludge and outlet means for treated water, characterized by flow directing means forcing the incoming polluted water to reach a level above said assembly and to flow downwardly through said assembly and towards said treated water outlet means.

In such flotation apparatus said water supply means is positioned at the bottom of said vessel at one end thereof.

The spaced elements constituting said assembly are preferably comprised by a set of spaced inclined parallel lamellae defining narrow passages for the flow of water, but may also be comprised by a set of spaced inclined parallel pipes forming such narrow passages.

Said water supply means is preferably constituted by inlet slot extending across substantially the whole width of the vessel.

It is also preferred that said treated water outlet means is positioned at the bottom of said vessel. In another embodiment according to the invention said outlet means is comprised by a flat box defining a bottom of said vessel, said box comprising a top wall and a bottom wall joined by side strips and being open at one end thereof and closed at the other end thereof, and said top wall being provided with a plurality of orifices communicating with said narrow passages for the flow of purified water toward said treated water outlet means defined by said one end of the box.

Said flat bottom box can also be comprised of squared pipes packed together being open at one end and closed in the other and with orifices communicating with said narrow passages for the flow and thus having the same function as the described flat bottom box.

In such embodiment said vessel is suitably provided with double side walls, the inside walls of which at the lower end thereof are provided with a plurality of openings communicating with said narrow passages defined by said lamellae, the purified water flowing via said openings upwardly between said sidewalls toward said treated water outlet means.

Furthermore, in the embodiment just described said water outlet means is preferably constituted by outlet weirs arranged at the top of said sidewalls, each weir being associated with a channel extending from one of said openings coextensively with and juxtaposed the corresponding narrow passage and positioned inside said sidewall.

In the flotation apparatus according to the invention it is preferred to include dispersion means positioned in association with said inlet means for the introduction of a gas for providing flotation.

The invention also provides for a process for the purification of polluted water by flotation, and said process involves the following steps:

a) introducing polluted water into a flotation zone at the top thereof while dispersing the water by the introduction of a gas therein;

b) generating a downward flow of the dispersed water through a zone of increased surface at such a flow rate that small gas bubbles are entrained with the water but coalesce on contact with said surface thereby rising to the top of the flotation zone;

c) removing skimmings from the top of the flotation zone and discharging separately purified water.

In the process according to this invention the surface load on the polluted water in the flotation zone preferably exceeds about 7 m/h and especially exceeds about 10 m/h.

In a preferred embodiment of the process according to the invention the polluted water is introduced at a level substantially equal to the bottom level of the flotation zone where it is dispersed with gas, and wherein the dispersed water is then imparted an upward flow outside of the flotation zone and is then directed to and distributed over said zone for downward flow therethrough.

Some specific embodiments of the invention will now be described more in detail with reference to the appended drawings, wherein FIG. 1 shows diagrammatically a perspective view of an embodiment of the flotation apparatus according to the present invention;

Figure 1:
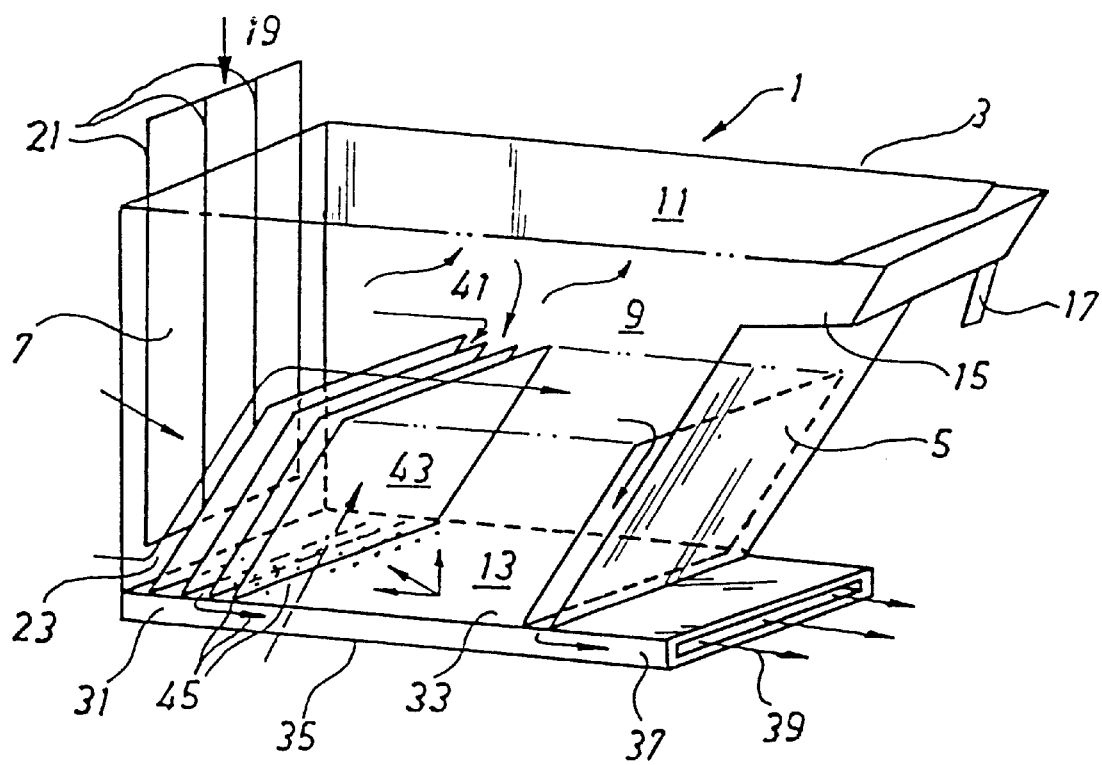

The embodiment of the flotation apparatus according to the invention shown in FIG. 1 in a diagrammatic perspective view comprises a vessel or container 3 with a front wall 5, a rear wall 7, end 9, 11, and a flat bottom 13. In association with the front wall 5 vessel 3 is provided with an extension 15 including a sludge outlet 17. At the other end of vessel 3 a pressurized air saturated water inlet 19 is connected to pipes 21 for the introduction of pressurized gas saturated water, suitably air, at the bottom of vessel 3 adjacent to the rear wall 7 thereof. At the lower end of said rear wall 7 there is arranged an inlet slot 23 for polluted water to be treated.

In the embodiment shown in FIG. 1 the bottom 13 is constituted by a flat box 31 having a top wall 33, a bottom wall 35 and side strips 37 joining the top and bottom walls. The flat box 31 has an open end 39 for the discharge of treated water, whereas the opposite end of box 31 is closed. Inside vessel 3 and on top of the flat box 31 a set 41 of inclined lamellae 43 are arranged, and between said lamellae 43 orifices 45 have been arranged for communication with the interior of the flat box 31.

Figure 2:
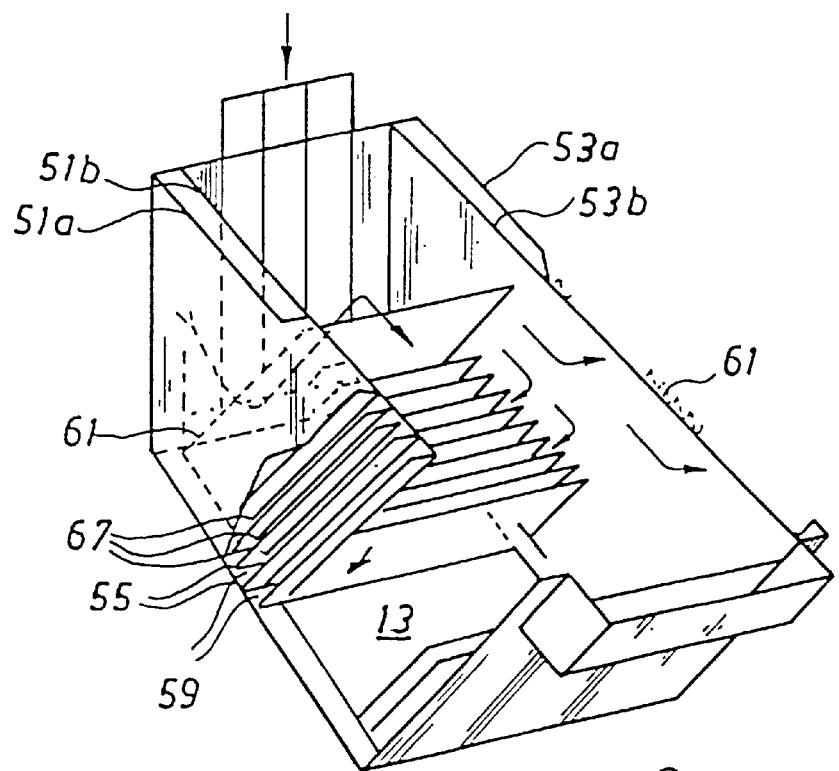
FIG. 2 shows also diagrammatically and in a perspective view, another embodiment of the flotation apparatus according to the invention.

The embodiment shown in FIG. 2 corresponds to that shown in FIG. 1 except for the following construction of features.

The apparatus of FIG. 2 is equipped with a single-walled bottom 13 instead of the flat box 31 of the apparatus shown in FIG. 1. Furthermore, the vessel or container is provided with double side walls 51a,51b and 53a, 53b. Within said double side walls there are arranged partitions 55, one opposite each lamella inside the vessel to form channels 57. Said channels 57 are at the lower ends thereof provided with openings 59, one for each channel, and at their upper ends weirs 61 are arranged, one for each channel 57. In other respects the embodiment of FIG. 2 corresponds to that shown in FIG. 1.

Figure 3:
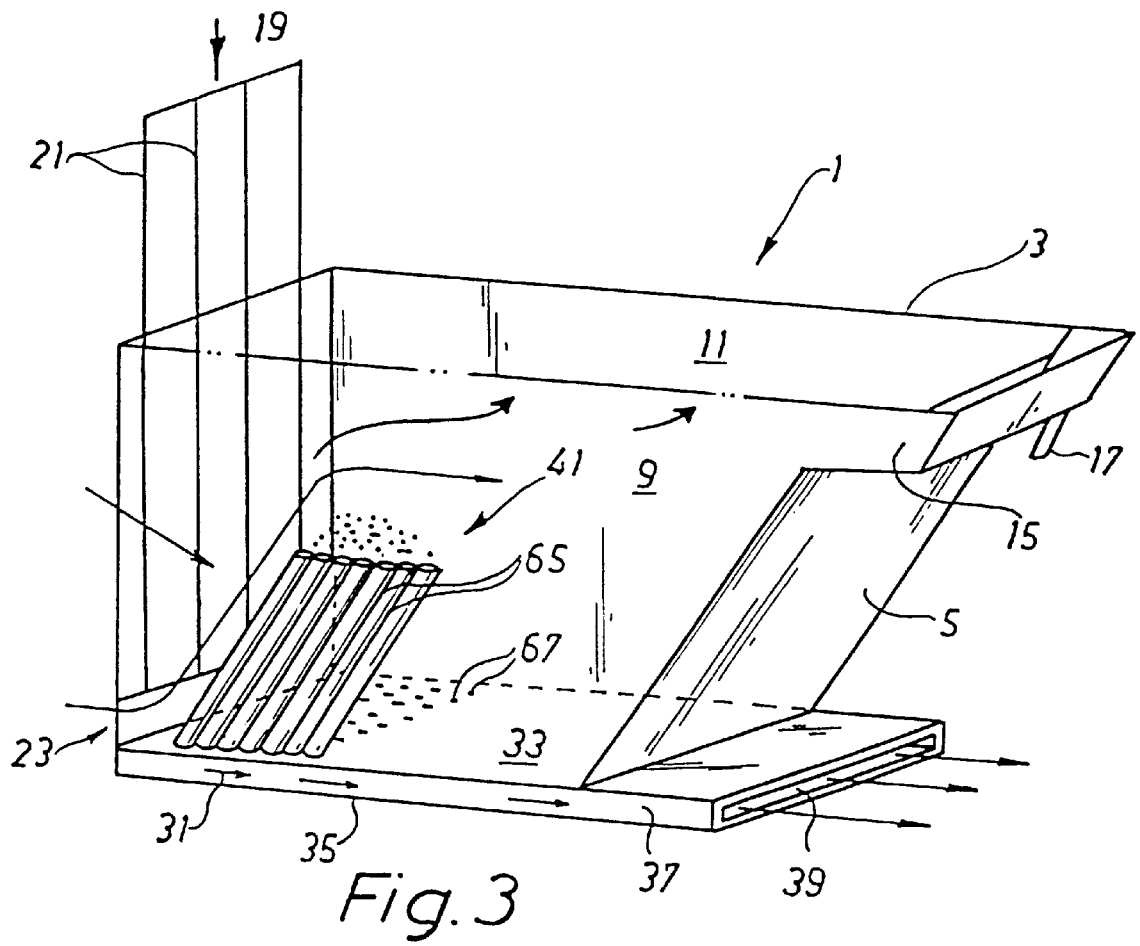
FIG. 3 shows, also in perspective and diagrammatically, a third embodiment of the flotation apparatus of this invention.

The embodiment of the flotation apparatus shown in FIG. 3 corresponds closely to that shown in FIG. 1 except for the fact that the set of lamellae 43 has been replaced by a set of pipes 65, each pipe being in communication with the inside of the flat box 31 through orifices 67. The design of the embodiment shown in FIG. 3 is otherwise the same as the design of the embodiment shown in FIG. 1.

The function of the embodiments shown in FIGS. 1 and 3 is briefly as follows.

Before entering the flotation apparatus the polluted water, such as sewage water, is flocculated in a conventional manner and enters the apparatus through the inlet slot at the bottom of the rear wall 7. The flocculated water then entering through slot 23 is then dispersed by the introduction of air through inlet 19 and pipes 21 through special valves at the bottom of the flotation apparatus. The instantaneous pressure fall in such valves releases the air in the form of microscopic bubbles. The air bubbles and the flocs attach to each other and move upwardly in vessel 3 and rise over the lamellae 43 or pipes 65 and up to the surface.

The aggregates of air bubbles and flocs form a sludge blanket on the surface and are transported by scrapers (not shown in the drawings) to the surface sludge outlet 17. The clear water together with small air bubbles flows downwardly and in between the lamellae 43 or pipes 65. Small air bubbles entrained in the water then coalesce on contact with the lamellae or pipes to form larger bubbles which move upwardly against the flow of water and to the surface. The water leaves the lamellae 43 or pipes 65 through the small outlet orifices 45 and 67, respectively, and the water is evenly distributed between the lamellae or pipes. Because of the restrictions created by the outlet orifices 45 a small head loss is created, which regulates the flow so as to evenly distribute it over the set of lamellae or pipes.

The treated water leaves the flotation vessel or tank 3 through the water outlet 39 via the space within the flat box 31, In the apparatus shown in FIG. 2 the conditions are the same as in the embodiments of FIGS. 1 and 3 except that the water passing downwardly between the lamellae flows sideways over the weirs and out from the flotation plant, The weirs are separated from each other and the water is thus evenly distributed between the passages defined by the lamellae.

The concept of the invention will now be illustrated by a specific example which, however, is not to be construed to limit the scope of the invention except as defined in the appended claims.

EXAMPLE

An ordinary flotation pilot plant was provided with an extra bottom above the normal outlet pipes. On this extra bottom lamella plates were placed, and between every plate holes were drilled through the bottom evenly distributed and with such a size that a small loss of head was created at normal loads. The water was forced to flow from the top and down between each lamella. Due to the head loss in the holes the flow through each lamella was the same. After passing the holes the water was allowed to leave the flotation plant through the normal effluent pipes. This pilot plant thus operated largely in the same manner as the embodiment shown in FIG. 1. An on line turbidimeter was connected to the pilot plant effluent.

The flotation pilot plant used involved the following operational data:

| Flotation tank length | m | 1.4 |
| --- | --- | --- |
| Flotation tank width | m | 0.7 |
| Nominal flotation surface | m² | 1.0 |
| Limited flotation surface during tests | m² | 0.63 |
| Number of lamella plates | | 14 |
| Lamella plate height | m | 0.50 |
| Inclination | deg | 50–60 |
| Lamella projected surface | m² | 2.86 |
| Lamella area | m² | 0.32 |
| Recycle rate through all experiments | % | 7–8 |
| Saturator pressure | bar | 5.2 |
| Coagulant dose of $Al^{3-}$ through all experiments | mg/l | 70 |

Raw water from Lackarebäck, Gothenburg, Sweden, was used in the experiments.

Two series of experiments were made, one with lamella plates and for comparison a second series without lamella plates corresponding to an ordinary flotation process. Different surface loads were applied and turbidity was measured continuously on line.

In the second series of experiments the lamella plates except for the first and the last one were removed. The extra bottom in the tank was, however; kept creating a small pressure drop when water was passing through the holes. This resulted in an extra air removal efficiency in the experiments. In view of limitation of the raw water flow the surface of the flotation was restricted to about half of the size in all the experiments. A plastic blanket from the bottom of the tank and to a level above the water surface was installed. The arrangement was tested for leakage during the experiments by dosing small amounts of rhodamine near all the corners and the walls where leakage could be expected.

Figure 4:
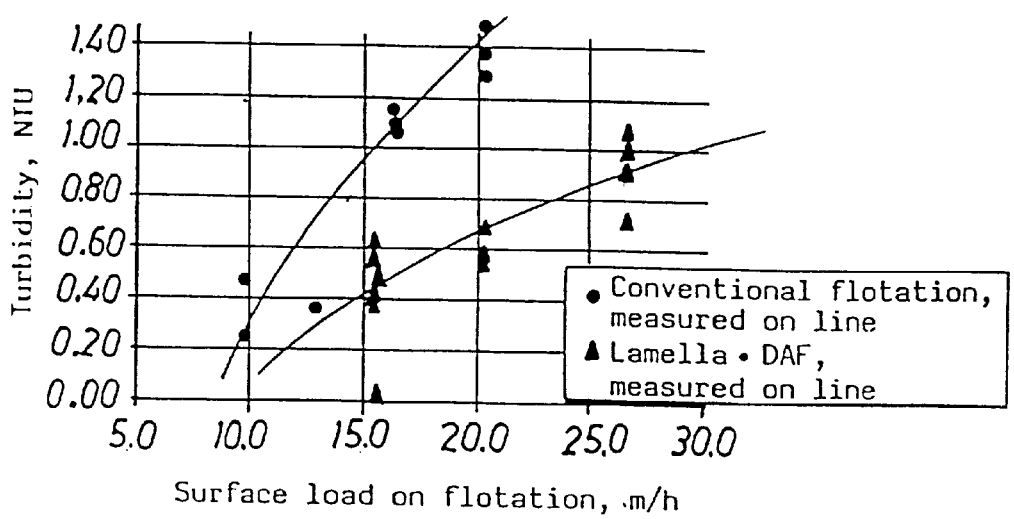
FIG. 4 shows a diagram comparing conventional flotation with lamellaeflotation in accordance with the present invention.

The results are presented in the diagram of FIG. 4 by plotting turbidity against surface load. The two curves representing conventional flotation as the upper curve end the use of lamellae according to the present invention as the lower curve clearly illustrate the efficiency of using the concept of the present invention. Thus, by using the lamellae flotation concept the surface load can be significantly increased thus increasing the capacity of the plant. A surface load exceeding 10 m/h can be successfully used and comparison shows that the surface load can be increased by about at least 50% while maintaining the same level of turbidity.

It is to be noted that the present invention is in no way restricted to the embodiments shown, and changes and modifications are apparent to those skilled in the art.

What is claimed is:

1. Flotation apparatus for the purification of polluted water comprising a flotation vessel having side walls and a bottom wall, an inlet means for supplying polluted water to said vessel, an assembly of a plurality of parallel, spaced elements defining passages for the flow of water through said elements, the spaced elements being inclined such that a top horizontal distance from the water supply means and tops of the spaced elements is greater than a bottom horizontal distance from the water supply means and bottoms of the spaced elements, and outlet means for surface sludge and outlet means for treated water, said water supply means is positioned at a bottom of said vessel at one end thereof, flow directing means is arranged to force the incoming polluted water to reach a level above said assembly and to flow downwardly through said assembly and towards said treated water outlet means, and said treated water outlet means comprises at least one compartment in communication with the bottom wall of said vessel, and wherein said spaced elements are positioned on said bottom wall, and extend between said side walls, whereby the water is distributed evenly over said assembly when passing therethrough.

2. Flotation apparatus according to claim 1, wherein said assembly of spaced elements is comprised by a set of spaced inclined parallel lamellae defining narrow passages for the flow of water.

3. Flotation apparatus according to claim 1, wherein said assembly of spaced elements is comprised by a set of spaced inclined parallel pipes defining narrow passages for the flow of water.

4. Flotation apparatus according to claim 1, wherein said water supply means is constituted by an inlet slot extending across substantially the whole width of said vessel.

5. Flotation apparatus according to claim 1, wherein said outlet means is comprised by a flat box.

6. Flotation apparatus according to claim 5, wherein said flat box has a top wall provided with orifices.

7. Flotation apparatus for the purification of polluted water, comprising a flotation vessel having side walls and a bottom wall, an inlet means for supplying polluted water to said vessel, an assembly of a plurality of parallel, spaced elements defining passages for the flow of water through said elements, and outlet means for surface sludge and outlet means for treated water, said water supply means is positioned at the bottom of said vessel at one end thereof, flow directing means is arranged to force the incoming polluted water to reach a level above said assembly and to flow downwardly through said assembly and towards said treated water outlet means, and said treated water outlet means comprises at least one compartment in communication with the bottom of said vessel, and wherein said spaced elements are positioned on said bottom walls, and extend between said side walls, whereby the water is distributed evenly over said assembly when passing therethrough, wherein said assembly of spaced elements is comprised by a set of spaced inclined parallel lamellae defining narrow passages for the flow of water, wherein said vessel is provided with double sidewalls, the inside walls of which at the lower end thereof are provided with a plurality of openings communicating with said narrow passages defined by said lamellae, the purified water flowing via said openings upwardly between said sidewalls toward said treated water outlet means.

8. Flotation apparatus according to claim 7, wherein said openings are arranged to evenly distribute the water over said assembly when passing therethrough.

9. Flotation apparatus according to claim 7, wherein said treated water outlet means is constituted by outlet weirs arranged at the top of said sidewalls, each weir being associated with a channel extending from one of said openings coextensively with and juxtaposed the corresponding narrow passage and positioned inside said sidewall.

10. Flotation apparatus according to claim 1, further comprising dispersion means positioned in association with said inlet means for the introduction of a gas for providing flotation.

11. A process for the purification of polluted water by flotation, comprising the steps of:

introducing polluted water through an inlet at a bottom of a flotation apparatus having an assembly of a plurality of parallel, spaced elements defining passages for the flow of water therethrough, said spaced elements being positioned on a bottom wall of said apparatus and extending between side walls of said apparatus, the spaced elements being inclined such that a top horizontal distance from the inlet and tops of the spaced elements is greater than a bottom horizontal distance from the inlet and bottoms of the spaced elements;

introducing the polluted water into a flotation zone at the top of the flotation vessel while dispersing the water by the introduction of a gas therein;

generating a downward flow of the dispersed water through a zone of increased surface, said zone comprising said assembly of parallel, spaced elements, at such a flow rate that small gas bubbles are entrained with the water but coalesce on contact with said surface thereby rising to the top of the flotation zone, the water being distributed evenly over said assembly when passing therethrough;

removing skimmings from the top of the flotation zone; and discharging separately purified water through treated water outlet means comprising a compartment in communication with said bottom wall of said vessel.

12. A process according to claim 11, wherein the surface load on the polluted water in said zone of increased surface exceeds about 7 m/h.

13. A process according to claim 11, wherein said zone of increased surface is established by inclined lamellae or pipes.

14. A process according to claim 13, wherein said zone of increased surface is established by inclined lamellae.

15. A process according to claim 11, wherein the polluted water is introduced outside of the flotation zone at a level substantially equal to the bottom level of the flotation zone where it is dispersed with gas, and wherein the dispersed water is then imparted an upward flow outside of the flotation zone and is then directed to and distributed over said zone for downward flow therethrough.

16. Flotation apparatus according to claim 2, wherein said water supply means is constituted by an inlet slot extending across substantially the whole width of said vessel.

17. Flotation apparatus according to claim 3, wherein said water supply means is constituted by an inlet slot extending across substantially the whole width of said vessel.

18. Flotation apparatus for the purification of polluted water, comprising a flotation vessel having side walls and a bottom wall, an inlet means for supplying polluted water to said vessel, an assembly of a plurality of parallel, spaced elements defining passages for the flow of water through said elements, and outlet means for surface sludge and outlet means for treated water, said water supply means is positioned at the bottom of said vessel at one end thereof, flow directing means is arranged to force the incoming polluted water to reach a level above said assembly and to flow downwardly through said assembly and towards said treatd water outlet means, and said treated water outlet means comprises at least one compartment in communication with the bottom of said vessel, and wherein said spaced elements are positioned on said bottom wall, and extend between said side walls, whereby the water is distributed evenly over said assembly when passing therethrough, wherein said water supply means is constituted by an inlet slot extending across substantially the whole width of said vessel, wherein said vessel is provided with double sidewalls, the inside walls of which at the lower end thereof are provided with a plurality of openings communicating with said narrow passages defined by said lamellae, the purified water flowing via said openings upwardly between said sidewalls toward said treated water outlet means.

19. Flotation apparatus according to claim 8, wherein said treated water outlet means is constituted by outlet weirs arranged at the top of said sidewalls, each weir being associated with a channel extending from one of said openings coextensively with and juxtaposed the corresponding narrow passage and positioned inside said sidewall.

20. A process for the purification of polluted water by flotation, comprising the steps of:

introducing polluted water into a bottom of a flotation apparatus having an assembly of a plurality of parallel, spaced elements defining passages for the flow of water therethrough, said spaced elements being positioned on a bottom wall of said apparatus and extending between side walls of said apparatus introducing the polluted water into a flotation zone at the top thereof while dispersing the water by the introduction of a gas therein;

generating a downward flow of the dispersed water through a zone of increased surface, said zone comprising said assembly of parallel, spaced elements, at such a flow rate that small gas bubbles are entrained with the water but coalesce on contact with said surface thereby rising to the top of the flotation zone, the water being distributed evenly over said assembly when passing therethrough;

removing skimmings from the top of the flotation zone; and discharging separately purified water through treated water outlet means comprising a compartment in communication with said bottom wall of said apparatus, wherein the surface load on the polluted water in said zone of increased surface exceeds about 7 m/h wherein said zone of increased surface is established by inclined lamellae or pipes.

21. A process according to claim 12, wherein the polluted water is introduced at a level substantially equal to the bottom level of the flotation zone where it is dispersed with gas, and wherein the dispersed water is then imparted an upward flow outside of the flotation zone and is then directed to and distributed over said zone for downward flow therethrough.

22. A process according to claim 13, wherein the polluted water is introduced outside of said flotation zone at a level substantially equal to the bottom level of the flotation zone where it is dispersed with gas, and wherein the dispersed water is then imparted an upward flow outside of the flotation zone and is then directed to and distributed over said zone for downward flow therethrough.

23. A process according to claim 14, wherein the polluted water is introduced outside of said flotation zone at a level substantially equal to the bottom level of the flotation zone where it is dispersed with gas, and wherein the dispersed water is then imparted an upward flow outside of the flotation zone and is then directed to and distributed over said zone for downward flow therethrough.

24. Flotation apparatus according to claim 1, wherein the compartment extends an entire length of the bottom wall.

25. Flotation apparatus according to claim 1, wherein said spaced elements and said passages cover the bottom wall.

26. Flotation apparatus according to claim 1, wherein the compartment extends an entire length of the bottom wall and said passages are in direct communication with the compartment.

27. A process according to claim 11, wherein the compartment extends an entire length of the bottom wall.

28. A process according to claim 11, wherein said spaced elements and said passages cover the bottom wall.

29. A process according to claim 11, wherein the compartment extends an entire length of the bottom wall and said passages are in direct communication with the compartment.

* * * * *